United States Patent

Cullen

[15] 3,641,503

[45] Feb. 8, 1972

[54] APPARATUS FOR SENSING AND COUNTING IMAGES DISPOSED ON INFORMATION BEARING MEDIA HAVING AN ADDED COUNTING CAPABILITY

[72] Inventor: Robert E. Cullen, Foxborough, Mass.

[73] Assignee: Eastman Kodak Company

[22] Filed: Apr. 24, 1970

[21] Appl. No.: 31,474

[52] U.S. Cl. ........................................ 340/172.5
[51] Int. Cl. ........................................ G06f 7/22
[58] Field of Search .......... 340/172.5, 146.2, 173 L, 173 LM; 353/25, 26; 11/11

[56] References Cited

UNITED STATES PATENTS

| | | | |
|---|---|---|---|
| 3,191,006 | 6/1965 | Avakian | 340/172.5 X |
| 3,217,293 | 11/1965 | Metz | 340/146.2 |
| 3,019,422 | 1/1962 | Eachus | 340/172.5 X |
| 3,253,134 | 5/1966 | North, Jr. | 340/146.2 X |
| 2,785,388 | 3/1957 | McWhirter et al | 340/172.5 X |
| 2,970,292 | 1/1961 | Kliever | 340/172.5 |
| 3,075,178 | 1/1963 | James | 340/172.5 |
| 3,484,751 | 12/1969 | Cameron et al. | 340/172.5 |

*Primary Examiner*—Gareth D. Shaw
*Assistant Examiner*—Sydney R. Chirlin
*Attorney*—Robert W. Hampton and R. Lewis Gable

[57] ABSTRACT

Apparatus is disclosed for sensing and counting the number of images disposed on an information-bearing medium such as a strip of microfilm. Specifically, a plurality of counting marks are associated with each of the images disposed on the information-bearing medium and are sensed illustratively by a radiation-sensing means which detects radiation derived from a suitable source alternately transmitted and intercepted by the counting marks. The radiation-sensing means provides a plurality of signals which are applied to a counting and memory circuit for counting the number of marks that have passed the radiation-sensing means. A comparison circuit is provided for producing a signal indicative of a coincidence between counted number of marks and a preselected number indicative of that image which is to be disposed at a utilization station. When a coincidence is so derived, the strip of microfilm will be brought to a stop and the selected images disposed at the utilization station. The counting and memory circuit has a limited capability as to the number of marks which it may count, illustratively determined by the number of decade counters comprising the counting and memory circuit. The counting and memory circuit of this invention is capable of counting numbers of images in excess of its capability and for directing the strip of information-bearing medium in the correct direction to thereby access the selected image at the utilization station.

17 Claims, 6 Drawing Figures

ROBERT E. CULLEN
INVENTOR.

BY R. Lewis Gable

ATTORNEYS

ROBERT E. CULLEN
INVENTOR.

BY R. Lewis Gable

ATTORNEYS

ROBERT E. CULLEN
INVENTOR.

BY [signature]

ATTORNEYS

ROBERT E. CULLEN
INVENTOR.

BY [signature]

ATTORNEYS

ROBERT E. CULLEN
INVENTOR.

BY [signature]

ATTORNEYS

ROBERT E. CULLEN
INVENTOR.

BY R. Lewis Gable

ATTORNEYS

APPARATUS FOR SENSING AND COUNTING IMAGES DISPOSED ON INFORMATION BEARING MEDIA HAVING AN ADDED COUNTING CAPABILITY

CROSS-REFERENCES TO RELATED APPLICATIONS

Reference is made to commonly assigned copending application Ser. No. 31,475, entitled APPARATUS FOR SENSING AND COUNTING IMAGES DISPOSED ON INFORMATION BEARING MEDIA, filed Apr. 24, 1970 in the name of Robert E. Cullen; to commonly assigned copending application Ser. No. 31,476, entitled APPARATUS FOR SENSING AND COUNTING IMAGES DISPOSED ON INFORMATION BEARING MEDIA, filed Apr. 24, 1971, in the names of William C. Ferenchak and Robert A. Phillips.

BACKGROUND OF THE INVENTION

1. Field of the Invention

This invention relates to apparatus for scanning and sensing a selected image from a plurality of images and more particularly to apparatus for counting the number of images scanned and for accessing a selected image whose number is in excess of the normal capability of the apparatus for counting.

2. Description of the Prior Art

The use of microfilm to store a great number of images or frames of information is well known in the art. Typically, an extended length of microfilm is used to receive photographically images thereon of documents or other suitable information. The processed strips of microfilm provide a suitable information storage media which may be wound in a roll and stored in a suitable cartridge or magazine until it is desired to display or produce one of the recorded images. The retrieving or accessing of a desired frame or image of information may be accomplished by inserting the roll of microfilm into a suitable viewer and of directing the strip of microfilm through the viewer while the operator observes the images being displayed upon the screen of the viewer. When the desired image has been found by the operator, he may observe at length the selected image or make a copy of the accessed image. The described process of finding a desired image is tedious and requires an inordinate amount of time to be spent by the operator to observe images slowly displayed upon the viewer.

One method of decreasing the time to access a desired frame or image of information, is to provide suitable apparatus for counting the number of images moved past a given point. Thus, the operator could simply enter on the control section of such apparatus the number of the image to be accessed and then, initiate the transport of the film at a comparatively high rate of speed past a sensing station until the desired number of images have been conveyed thereby and counted. At this point, the strip of microfilm is stopped and the image or frame whose number was previously entered, is now in position to be displayed or to be copied.

In an automated image retrieval system as described in the above-identified copending applications, counting marks are disposed on the strip of microfilm in a defined relationship with the images or frames of information and are encoded with a unique number typically greater than the number assigned to the preceding mark. In order to access a selected image, the strip of information-bearing medium is directed past a radiation-sensing means so that the counting marks intercept a beam of radiation directed onto the radiation-sensing means. Initially, the number of the image to be accessed is entered onto a suitable memory. A counting and memory circuit is provided for continuously counting the number of images which are directed past the radiation-sensing means. A further circuit coupled to the counting circuit and memory circuit serves to compare the number stored upon the memory and the number of marks that have been counted to produce a signal indicative of a coincidence between these numbers. When a coincidence signal is produced, the strip of information-bearing medium may be brought to a halt so as to place the image or frame, whose corresponding mark is encoded with the preselected number, at a utilization station. In a microfilm reader, the utilization station could typically take the form of a projection gate whereat the accessed image or frame may be projected onto a screen.

Initially, it is necessary to adjust the counting circuit in order to indicate the first number of the frame or image recorded upon the strip of the information-bearing medium. Then, the strip may be moved in a forward direction until a coincidence signal is produced to thereby place the preselected image at the utilization station. If it is then desired to access a second image, the encoding number is entered on the memory and the strip will be moved in either the first forward direction or in a backward direction depending upon whether the encoding number is higher or lower then the number of the image from which the search began. For example, if the mark number 2,000 is placed at the utilization station and it is desired to access image 1,500, the strip of information-bearing medium would be directed in a second or backward direction until a coincidence signal was derived to place the image number 1,500 at the utilization station.

An automated retrieval apparatus as described above should have a capability of counting the maximum number of images or frames disposed upon a strip of information-bearing medium. In addition, it would be desirable that the counting circuit of such a retrieval apparatus have a capability of counting a number of images or frames higher than the number of images or frames disposed upon a single strip of the information-bearing medium. The added counting capability is particularly desirable when the first image on a strip is encoded with a number so high that the encoding number of the last image is greater than the normal capability of the counting circuit. For example, a counting circuit could illustratively be made up of five counting decades for respectively counting the units, 10's, 100's, 1,000's, and 10,000's digits to provide a capability of counting numbers up to 99,999. Thus, no problems would appear if the numbers to be counted on a strip or strips of an information-bearing medium were all encoded with numbers equal to or less than 99,999. However, where the first number on a strip of an information-bearing media is illustratively 80,000 and the last number is 108,000, it would normally be necessary to increase the capacity of the counting circuit or to replace the present counter with one of greater capability. Illustratively, this could be accomplished by adding an additional decade to the counting circuitry. Further, it would also be necessary to modify the comparison circuitry, the memory circuit and any display circuitry and apparatus to access the additional images which are encoded with numbers above 99,999.

If because of a cost or other consideration, it was not desired to increase the counting capability of the counting apparatus, the following situation would arise where it is desired to count and access a frame of information encoded with a number higher than the normal capability of the counting circuit. In the example described above, where the first number of the strip of the information-bearing medium is encoded with the number 80,000 and it is desired to access the last image encoded with the number 108,000, the number 108,000 would be entered upon the memory. However, the memory has only five decades and is capable of storing a number up to only 99,999; thus, the memory is unable to store the hundred thousand's digit of this number with the result that the memory indicates that the number to be accessed is 08,000. Since the comparison circuit would interpret this request to go 72,000 images in the direction of decreasing numbers to access image number 8,000, the strip of information-bearing media would be directed in a backward direction. This, of course, would be an incorrect command on the part of the apparatus since the true command would be to go 28,000 documents in a direction of an increased numbers to access image number 108,000.

SUMMARY OF THE INVENTION

It is therefore, an object of this invention to substantially increase the number of images or frames of information that may be counted and accessed.

It is further an object of this invention to permit the accessing of an image encoded with a number higher than the inherent capability of the apparatus to count.

It is a still further object of this invention to permit an overcount capability of an accessing apparatus without the additional expense of replacing the counting mechanism or adding additional decades to the counting circuitry of the apparatus.

These and other objects are accomplished in accordance with the teachings of this invention by providing apparatus for sensing and counting images disposed upon a strip of an information-bearing medium such as microfilm. More specifically, the apparatus includes means for sensing the passage of the counting marks associated with the images and for counting the number of marks so indicated upon a counting circuit. The counting circuit responds to the manifestations of the signals received from the sensing means to count the number of marks directed past the sensing means and to provide a first signal indicative of the number of marks counted. The signal indicative of the number of counted marks is compared with another signal indicative of the encoded number of the image to be accessed, to provide a strip halt signal when a coincidence between these numbers occurs. In accordance with the teachings of this invention, a comparison or interpretation circuit compares the first signal with a second signal indicative of the number of the image to be accessed, to determine whether the difference therebetween is greater than a predetermined number dependent upon the counting capability of the counting circuit and the number of images disposed on the information-bearing medium. If the difference is greater than the predetermined number, the comparison circuitry causes the information-bearing medium to be moved in a direction opposite to that normally indicated by the magnitudes of the compared numbers.

In an illustrative embodiment of this invention, the counting circuit is made up of five decades indicating the ability to count numbers up to 99,999 and a memory circuit is composed of five decades upon which the preselected number of the image to be accessed, is stored. In accordance with the teachings of this invention, a comparison of the numbers stored upon the decade counter and memory may be achieved by making a limited comparison between the 8's, 4's, and 2's bits of the fifth decade of the counter and memory to thereby indicate when a reversal of direction of the information-bearing medium will be required to correctly access the desired information image or frame.

The invention and its objects the advantages, will become more apparent in the detailed description of the preferred embodiment presented below.

BRIEF DESCRIPTION OF THE DRAWING

In the detailed description of the preferred embodiment of the invention presented below, reference is made to the accompanying drawing, in which.

DESCRIPTION OF THE PREFERRED EMBODIMENT

Figure 1:
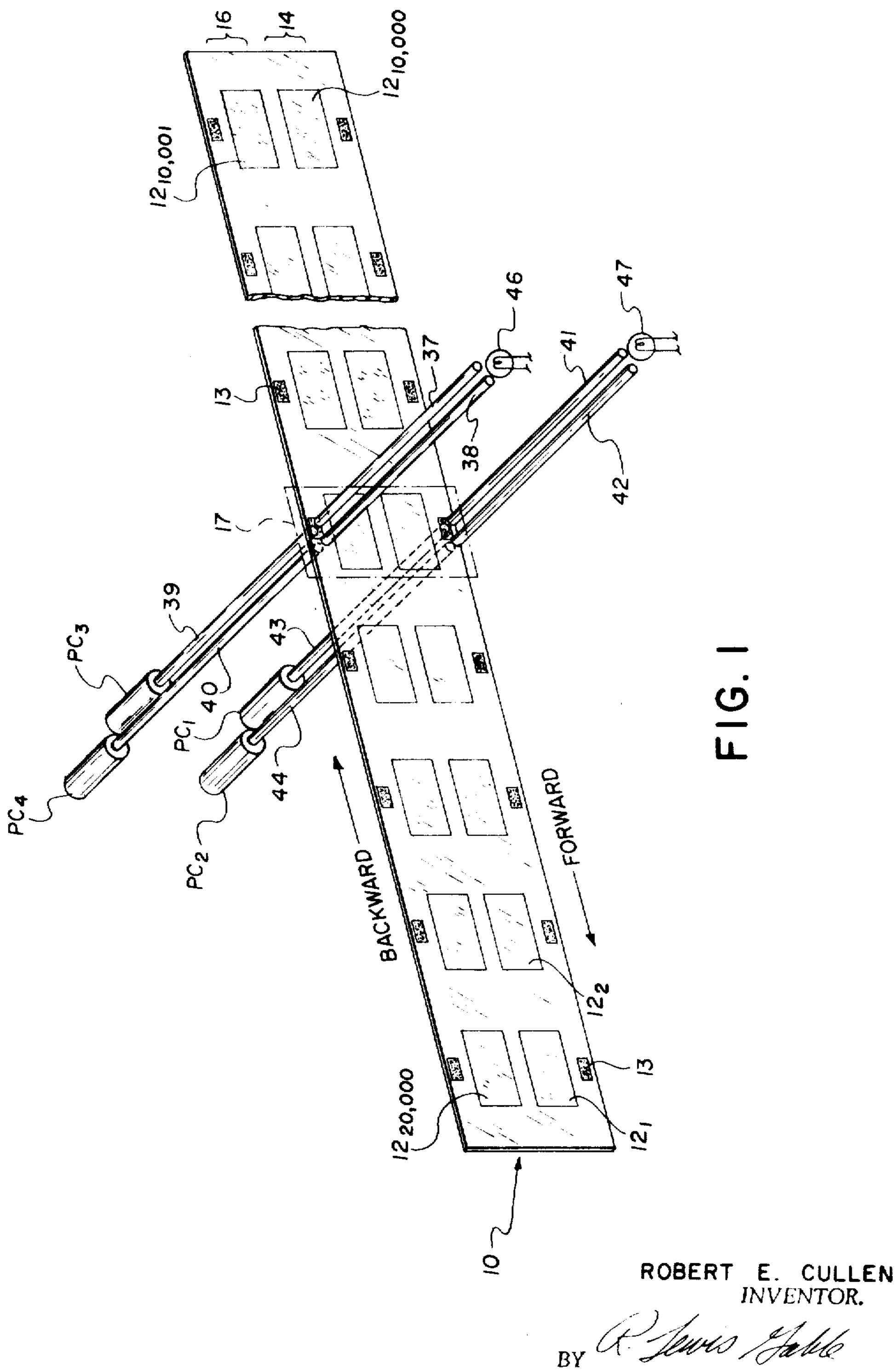
FIG. 1 is a perspective view of a strip of microfilm having recorded thereon first and second rows of information images (or frames) and apparatus for sensing and providing manifestations of the counting indicia or marks associated with each of the images recorded thereon.

With reference now to the drawings and in particular to FIG. 1, there is shown a strip 10 of an information-bearing medium such as microfilm having recorded thereon a plurality of images 12. The images 12 are arranged in a first (bottom or standard) row 14 and in a second (top or duo) row 16. In the illustrated embodiment, the strip 10 of microfilm may have 20,000 images 12 recorded thereon and the encoding number of the image 12 is indicated by a subscript. As shown in FIG. 1, the first image in row 14 is designated $12_1$ and the last image in row 14 is designated $12_{10,000}$; in a similar fashion, the first image in row 16 is designated $12_{10,001}$; whereas the last image in row 16 is designated $12_{20,000}$. Further, a plurality of counting indicia or marks 13 are disposed in a fixed relationship with respect to each of the images 12. Illustratively, the counting marks 13 are disposed at the approximate center of the corresponding image 12 between the rows of images 12 and the longitudinal edges of the strip 10.

In accordance with the teachings of this invention, it is desired to be able to access any of the 20,000 images 12 recorded upon the strip 10 of microfilm. This is accomplished by comparing a predetermined number of the image 12 to be accessed with the number of marks 13 which have been counted as the strip 10 of microfilm is directed past a utilization station 17. When the number of marks 13 that have been scanned and counted, equals the predetermined number, the apparatus for driving the strip 10 of microfilm will be operated to bring the strip 10 to a stop, so as to place the selected image 12 at a utilization station 17. Illustratively, the utilization station 17 could be a projection gate where the selected image is projected onto a display screen of a microfilm reader or viewer.

With regard to FIG. 1, there is shown an assembly made up of photocells $PC_1$ and $PC_2$, and $PC_3$ and $PC_4$ for detecting respectively the passage of the counting marks 13 associated with the images of the rows 14 and 16. More specifically, a suitable source 47 of radiation is disposed to direct radiation through conduits 41 and 42 made of a suitably radiation transmissive material such as the plastic Crofon (a trademark of the Dupont Co.). The radiation conduits 41 and 42 are disposed so that the radiation emitting from the end of the radiation conduits 41 and 42 will be intermittently intercepted by the counting marks 13 associated with the images 12 of the lower row 14. A second pair of radiation conduits 43 and 44 is disposed to receive the radiation emanating from the ends of the radiation conduits 41 and 42 respectively. The radiation transmitted through the radiation conduits 43 and 44 is directed onto the radiation sensitive portions of photocells $PC_1$ and $PC_2$ respectively. In an illustrative embodiment of this invention, the photocells $PC_1$ and $PC_2$ may take the form of phototransistors. In a manner similar to that described above, a source 46 of radiation is disposed to direct radiation through the radiation conduits 37 and 38 so as to be intercepted by the marks 13 associated with the images 12 of the second or duo row 16. The radiation transmitted through the strip 10 of microfilm is coupled by a pair of radiation conduits 39 and 40 to a second pair of photocells $PC_3$ and $PC_4$. It may be understood that a single radiation conduit may replace the pair of conduits 41 and 42 (or 37 and 38) to transmit the radiation from the source 47 (or 46) to the strip of microfilm 10. The photocells $PC_1$, $PC_2$, $PC_3$, and $PC_4$ receive pulses of radiation from the radiation conduits as the counting marks 13 are directed thereby. This intermittent "covering" and "uncovering" of the radiation conduits generates the radiation pulses that are sensed by the photocells $PC_1$, $PC_2$, $PC_3$ and $PC_4$ which in turn provide a manifestation (or signal) in the form of electrical pulses to indicate the passage of the counting marks 13. The manner in which each of the pairs of photocells $PC_1$ and $PC_2$, and $PC_3$ and $PC_4$ operate to sense the passage of a counting mark 13 is explained in the above-identified copending applications.

Figure 2:
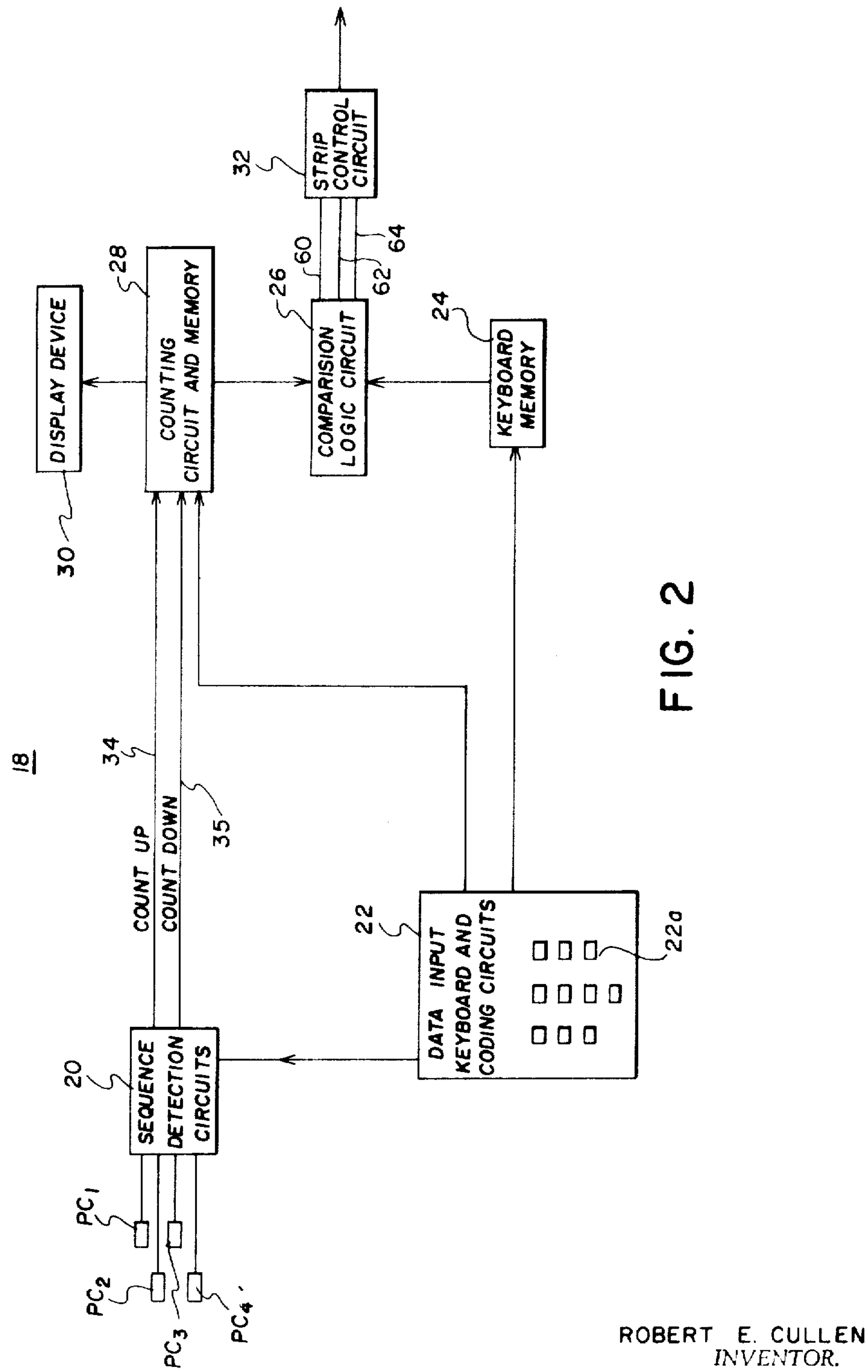
FIG. 2 shows the diagrammatic representation of the circuit for sensing the signals or manifestations derived from the photocells $PC_1$, $PC_2$, $PC_3$ and $PC_4$ shown in FIG. 1, and for processing these signals in order to control the movement of the strip of microfilm.

With regard to FIG. 2, there is shown diagrammatically the operation of a control circuit 18 for receiving the signals generated by the photocells $PC_1$, $PC_2$, $PC_3$ and $PC_4$ and for controlling the accessing of the selected image from the strip 10 of microfilm. First the operator will enter as by keys 22*a* of a data input keyboard and coding circuit 22, the desired number of the image to be retrieved from those recorded on the strip 10 of microfilm. A signal generated by the data input keyboard coding circuit 22 is applied to a keyboard memory 24 which serves to store the predetermined number for later use. In a manner to be explained later, one pair of the photocells $PC_1$ and $PC_2$, or $PC_3$ and $PC_4$ will supply the signals to a sequence detection circuit 20, which functions to provide a signal to either a pair of conductive paths 34 or 35 dependent upon whether a countup or countdown signal is to be generated. As shown in FIG. 2, the conductive paths 34 and 35 are connected to a counting and memory circuit 28, which serves to count and store the successive signals applied over the conductive paths 34 and 35. Thus, as successive counting marks 13 are sensed, the counting and memory circuit 28 will serve to count and store the number of counting marks so sensed.

As explained in the above-identified copending applications, the operation of the sequence detection circuit 20 depends upon which row 14 or 16 of images 12 is being counted, the type of strip 10 that is being sensed, i.e., whether the strip 10 is positive or negative microfilm, and in which direction the strip 10 is being moved. The number of the images 12 counted and stored on the circuit 28 is indicated by a display device 30. Typically, the display device 30 may be made up of a plurality of decade display devices corresponding to the number of decades in the memory of circuit 28. Thus, an operator may readily see upon the display device 30 the number of images 13 that have been sensed and counted by the control circuit 18. As shown in FIG. 2, signals indicative of the number stored upon the keyboard memory 24 and upon the counting and memory circuit 28 are applied to a comparison logic circuit 26 which serves to compare the numbers stored on the counting circuit and memory 28 and the keyboard memory 24. When the comparison logic circuit 26 senses a coincidence between these two numbers, a signal will be generated by the circuit 26 and applied to a strip control circuit 32 to thereby indicate that the preselected number of marks 13 (and therefore images 12) have been counted.

Figure 3:
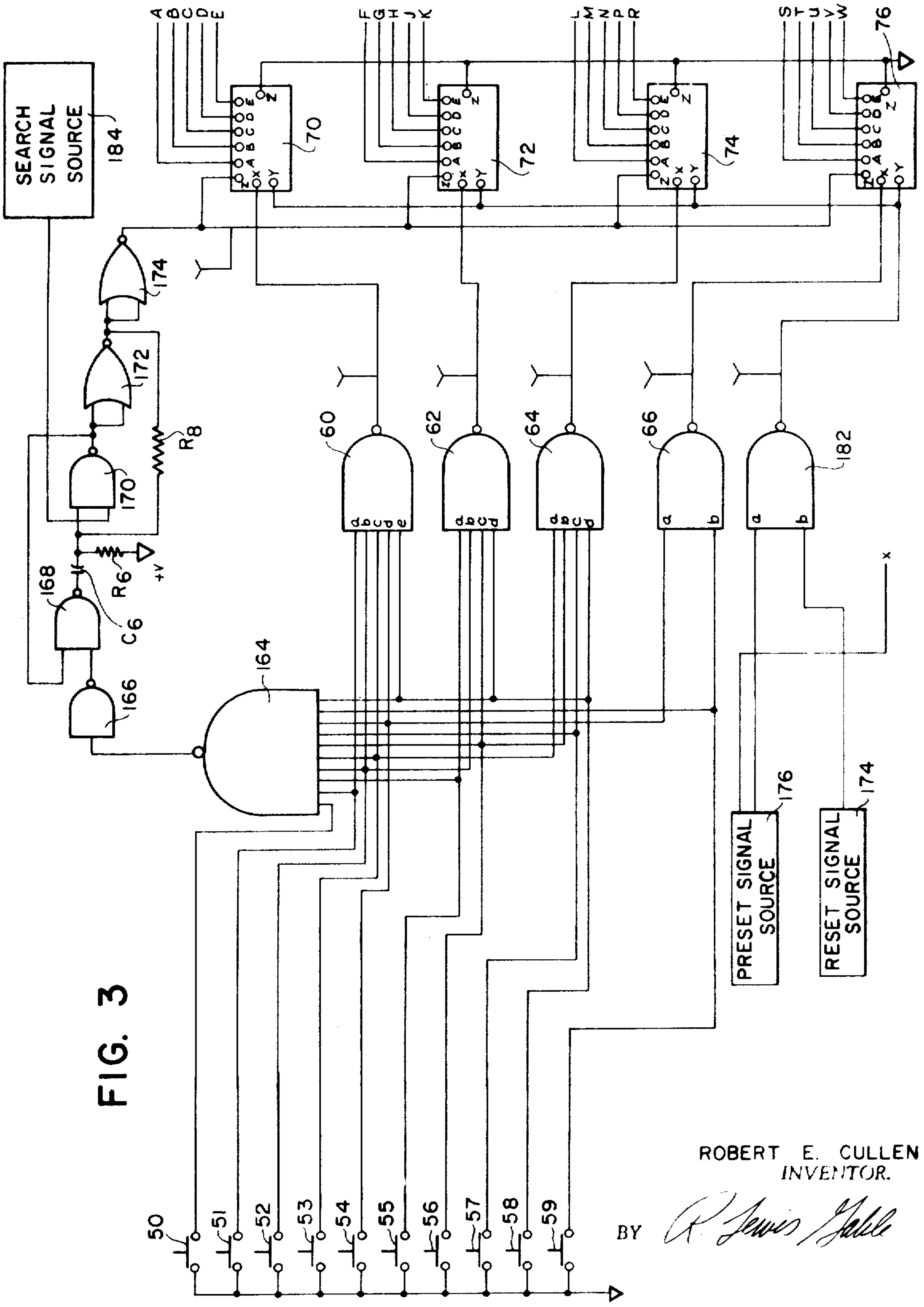
FIG. 3 is a detailed, schematic representation of the data input keyboard and coding circuit and memory shown in FIG. 2.

With reference now to FIG. 3, there is shown schematically an illustrative embodiment of the data input keyboard and coding circuit 22 and the keyboard memory 24 as seen in FIG. 2. In particular, the circuit 22 includes a keyboard section 22*a* made up of a plurality of switches or keys 50 to 59, which may be disposed from a first to a second position to thereby register or enter on the keyboard memory 24 a number corresponding to the depressed switch. Illustratively, the switches may be spring biased to their first position. As shown in FIG. 3, the actuation of switches 50, 51, 52, 53, 54, 55, 56, 57, 58 and 59 will enter the coded numbers 0–9 upon the shift registers 70, 72, 74 and 76, which may illustratively be of the type SN7496 as manufactured by Texas Instruments Company. As shown in FIG. 3, the switches 50 to 59 are connected to NAND-gates 60, 62, 64 and 66 are encoded number on the shift registers 70, 72, 74 and 76. More specifically, when switch 51 is depressed, a "0" or low signal is applied to the input of NAND-gate 60 which in response hereto generates a high or "1" signal. The "1" signal produced by the NAND-gate 60 is applied to the serial input X of the shift register 70. Assuming that the shift registers are clocked, a "1" signal will appear at the A-output of the shift register 70. As seen in FIG. 3, it is noted that switch 51 is only connected to the NAND-gates 60 and 164 so that no other "1" signals are applied to the shift registers 72, 74 and 76. As a result, at the end of the first input operation, a "1" or high signal will appear at the A-output of the shift register 70 whereas low or "0" signals will appear at the A-output terminals of the shift registers 72, 74, and 76. Thus, it may be recognized that the shift registers 70, 72, 74 and 76 serve respectfully to provide the 1's, 2's, 4's and 8's bits of the most recently entered number to be placed on the keyboard memory 24.

If the next digit of the number to be entered is a 2, the switch 55 is disposed from its first to its second position to thereby apply a "0" signal to the NAND-gate 62 which in turn applies a "1" or high signal to the shift register 72. As will be noted from FIG. 3 the switch 55 only applies a "0" signal to the NAND-gate 62 and NAND-gate 164 and that as a result, "0" signals will appear at the input terminals X of the shift registers 70, 74 and 76. In binary coding a 0 0 1 0 manifestation corresponding to the 8's, 4's, 2's and 1's bits and appearing respectively at the input terminals X of the shift registers 76, 74, 72 and 70 represents a 2 as the most recently entered digit of the number to be stored. In order to transfer the 2 that is on the input terminals X of the shift registers to the output terminals A, it is necessary to shift a priming pulse at the Z-terminal of the shift register. In order to prime the shift register 70, 72, 74 and 76 for receiving the next digit and for shifting to the right any bits that may have been previously entered, a "0" pulse is generated by a circuit including a NAND-gate 164. As shown in FIG. 3, each of the switches 50 to 59 are connected to an input of the NAND-gate 164 which in response to the closing of one of the switches 50 to 59, produces a "1" signal to be applied to a NAND-gate 166. The NAND-gate 166, acting as an inverter, applies a "0" input to a NAND-gate 168. In turn, the NAND-gate 168 generates a "1" signal which is applied to a differentiating circuit comprised of capacitor $C_6$ and resistor $R_6$. The differentiating circuit produces a "1" pulse which is applied to the *a* input of a NAND-gate 170. In response thereto, the NAND-gate 170 produces a "0" pulse whose length is dependent upon the values of capacitor $C_6$ and the resistor $R_6$. The "0" pulse is applied to both inputs of a NOR-gate 172, which produces a "1" pulse to be applied through a resistor $R_8$ to the *a* input of the NAND-gate 170. This causes the pulse developed at the differentiated circuit to fall rapidly back to "0" once the pulse crosses the zero threshold of gate 170. Further, the output of NAND-gate 170 is connected to the *a* input of the NAND-gate 168 to insure that the output of NAND-gate 168 is maintained at "1" until the differentiating circuit has timed out. Next, the output of the NOR-gate 172 is applied to the inputs of a NOR-gate 174, which is in turn connected to the Z-inputs of the shift registers 70, 72, 74 and 76 to thereby prepare the shift registers for receiving the next digit of the number and for shifting to the right any bits that may have been previously entered. In addition, a search signal source 184 generates a "0" signal to be applied to the *b* input of the NAND-gate 170 to disable the NAND-gate 170 when a search is being conducted and a "1" signal to enable the NAND-gate 170 when a search is not being conducted.

Thus after the primary pulse has been applied, the number "12" has now been stored upon the shift registers shown in FIG. 3. In a manner similar to that described above, the switches 50 to 59 may be successively actuated three more times, each time entering a new number and shifting the previously entered numbers to higher order decades. At the end of these actuations, the first digit entered, viz. 1, appears in the 10,000's decade. In such a manner, a plurality signals representing in a binary fashion a number between 0 and 99,999 is provided at terminals marked A through W at the right side of FIG. 3. In addition, a signal is developed by a NAND-gate 182 to be applied to the clear inputs Y of the shift registers 70, 72, 74 and 76 to thereby clear or remove the number stored upon the shift registers. As shown in FIG. 3, a preset signal source 176 and a reset signal source 173 are connected to the inputs of the NAND-gate 182, which responds to signals generated by the sources 176 and 173 to apply a clear signal to the shift registers 70, 72, 74 and 76. The shift registers 70, 72, 74 and 76 will be cleared after the number stored upon the shift registers has been transferred, in a manner to be explained, to the decade counters of the counting circuit and memory 28. The reset signal source 173 generates a signal to cause a clearing of the shift registers when it is desired to commence a new search.

Figure 4:
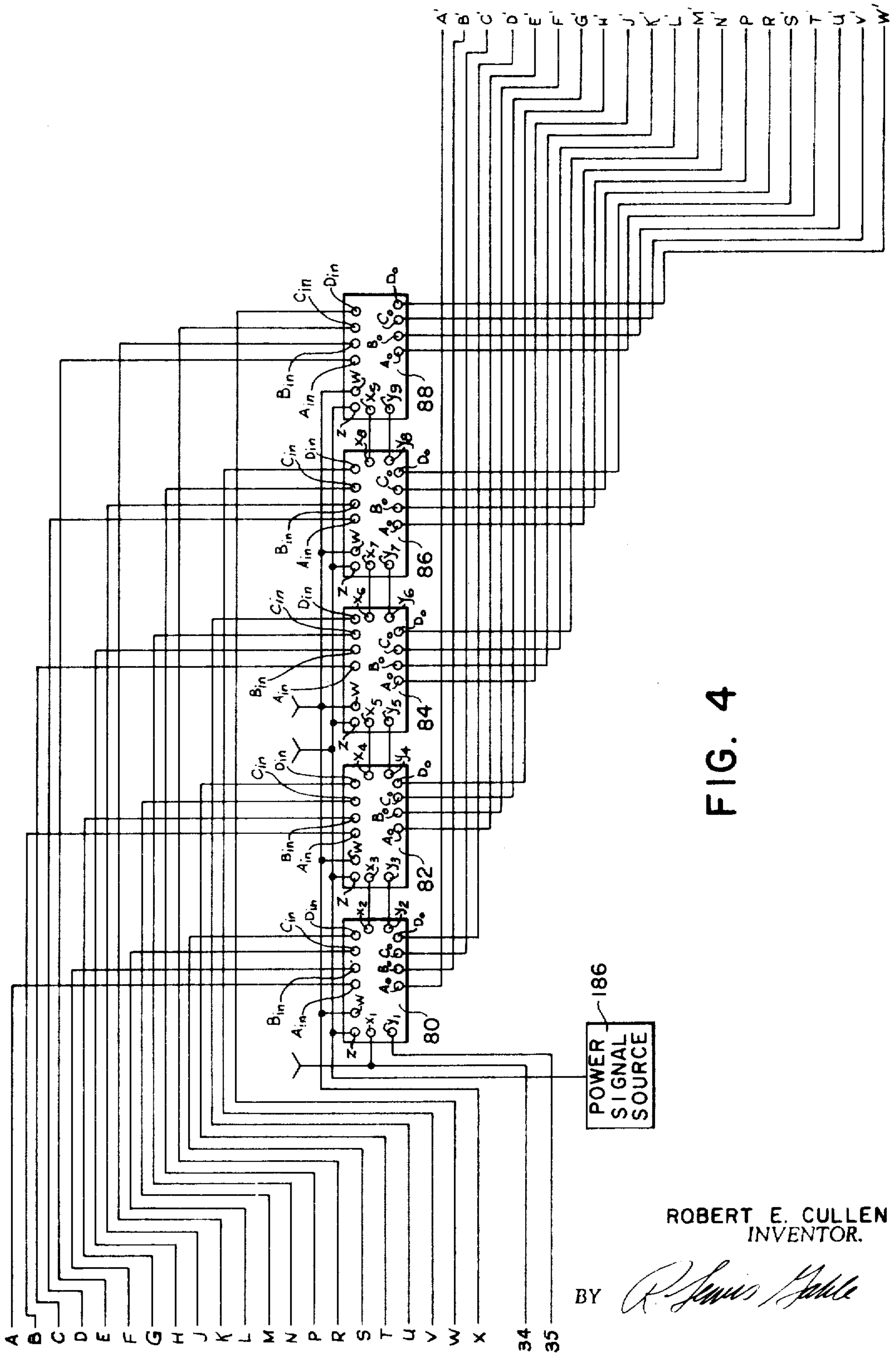
FIG. 4 is a schematic showing of the counting and memory circuit as shown in FIG. 2.

With reference to FIG. 4, there is shown schematically an illustrative embodiment of the circuitry of the counting circuit and memory 28. More specifically, countup and countdown signals are respectively applied to the counting circuit and memory 28 on a pair of conductive paths 34 and 35 to initiate within the circuit 28 a counting-up or counting-down procedure dependent upon which signal is received from the sequence and detection circuit 20. Reference is made to copending applications identified above to explain in detail the operation of the sequence and detection circuit 20 to analyze the signals received from the photocells $PC_1$, $PC_2$, $PC_3$ and $PC_4$ and to provide either a countup or countdown signal. As shown in FIG. 4, the counting circuit and memory 28 is composed of the decade counters 80, 82, 84, 86 and 88. In particular, the countup and countdown signals are applied through conductive paths 34 and 35 to the $x_1$- and $Y_1$-inputs of the decade counter 80. In an illustrative embodiment of this invention, the decade counters 80, 82, 84, 86 and 88 may take the form of the decade counters manufactured by the Texas Instrument Company and identified by the number SN 74192 N. As is well known in the art, these decade counters respond to each pulse applied to its input terminals X and Y to countup and to countdown respectively. When the first decade counter 80 has been filled, i.e., nine countup pulses have been applied to the $X_1$ input terminal, the next countup signal will actuate the second decade counter 82. As shown in FIG. 4, the $X_2$ and $Y_2$ output terminals of the decade counter 80 are connected respectively to the $X_3$ and $Y_3$ terminals of the second decade counter 82. In an analogous fashion, the countup and countdown signals may be applied to the third decade counter 84, the fourth decade counter 86, and the fifth decade counter 88 to thereby permit the counting of countup and countdown signals up to 99,999. It may be understood that the signals appearing at the $A_o$, $B_o$, $C_o$ and $D_o$ output terminals of the first decade counter 80 represent in binary fashion the first digit of the number of images 12 that have been scanned. In a similar fashion, the decade counters 82, 84, 86 and 88 represent the 10's, 100's, 1,000's and 10,000's digits of the number of images 12 that have been scanned. The output signals developed at the $A_o$, $B_o$, $C_o$ and $D_o$ terminals of the decade counters are applied as will be explained later, to the comparators of the comparison logic circuit 26 as shown in FIG. 5A.

Further as shown in FIG. 4, a power signal source 186 is connected to the Z input terminals of the decade counters 80, 82, 84, 86 and 88 to clear the decade counters in preparation for counting when a power source is applied to the control circuit 18. In addition, a preset signal is derived from the preset signal source 176 through terminal X (see FIG. 3) and is applied to the W input terminals of the decade counters 80, 82, 84, 86 and 88 to permit the entry of the number(s) stored on the shift registers 70, 72, 74 and 76 through the terminals $A_{in}$, $B_{in}$, $C_{in}$ and $D_{in}$ of the decade counters. Thus, the decade counters 80, 82, 84, 86 and 88 may be primed with a number other than "0" to permit the counting-up or counting-down from any preselected starting number. For example, there may be a series of strips 10 having images thereon numbered consecutively. In order to search a strip 10 of microfilm whose first image is encoded with a number, e.g., 60,000, it would be necessary to enter the encoded number minus one of the first image onto the decade counters 80, 82, 84, 86 and 88. This would be accomplished by first entering the encoding number minus one of the first or starting image into the shift registers 70, 72, 74 and 76, and then transferring the encoding number to the decade counters 80, 82, 84, 86 and 88 by applying a preset signal from source 176 to the decade counters. In an illustrative embodiment of this invention, the strip 10 may have an opaque leader which necessitates the entering of a number one less than the assigned number of the first image.

As explained above, the comparison logic circuit 26 compares the signals derived from the deade counters 80, 82, 84 and 86, which signals indicate in a binary fashion the encoded number of the image being scanned by the photocells $PC_1$, $PC_2$, $PC_3$ or $PC_4$, and the preselected number of the image to be accessed which is stored upon the shift registers 70, 72, 74 and 76 of the keyboard memory 24. With reference to FIG. 5A, the comparison logic circuit 26 includes decade comparators 90, 92, 94, 96 and 100 whose inputs are connected to the decade counters of the circuit 28 and the shift registers of keyboard memory 24 to provide output signals indicative of whether the number of scanned images or the preselected number is greater to thereby control the direction in which the strip 10 of microfilm should be directed and also when the strip of microfilm should be brought to a halt at the utilization station 17. In an illustrative embodiment of this invention, the comparators 90, 92, 96, 98 and 100 may be of the type identified by the number DM8200N as manufactured by National Semiconductor Company. The comparators shown in FIG. 5A function in a manner well known in the art to compare the signals applied to the inputs $A_4$, $A_3$, $A_2$ and $A_1$ against the corresponding inputs $B_4$, $B_3$, $B_2$ and $B_1$ respectively, to provide output signals at the X or Y output terminals. If the number presented on the A-terminals is greater than the number presented on the B-terminals, a "1" or high signal will be derived from the output terminal X and a "0" signal will be derived from the output terminal Y. If the number presented at the B-terminals is greater than that presented at the A-terminals a "1" or high signal will be derived from the terminal Y a "0" signal will be derived from the output terminal X. If number presented on the A input terminals equals the number present to the B input terminals, then "1" signals will be produced at the X and Y output terminals. More specifically, if the number applied to the terminal $A_4$ is greater than the terminal $B_4$, a "1" or high signal will be produced automatically at the X output terminal without providing further comparison between the input terminals. However, if the number applied to the $A_4$ input is equal to number applied to the $B_4$ input, a subsequent comparison operation is provided between the signals applied to the $A_3$ and $B_3$ terminals. Such a procedure will continue until the number applied to one of the terminals is greater than that applied to the corresponding terminal at which time either a "1" signal will be produced at either the X or Y terminals dependent upon which set of inputs is greater. A "0" signal will be produced at the other terminal of the comparator.

Figure 5A:
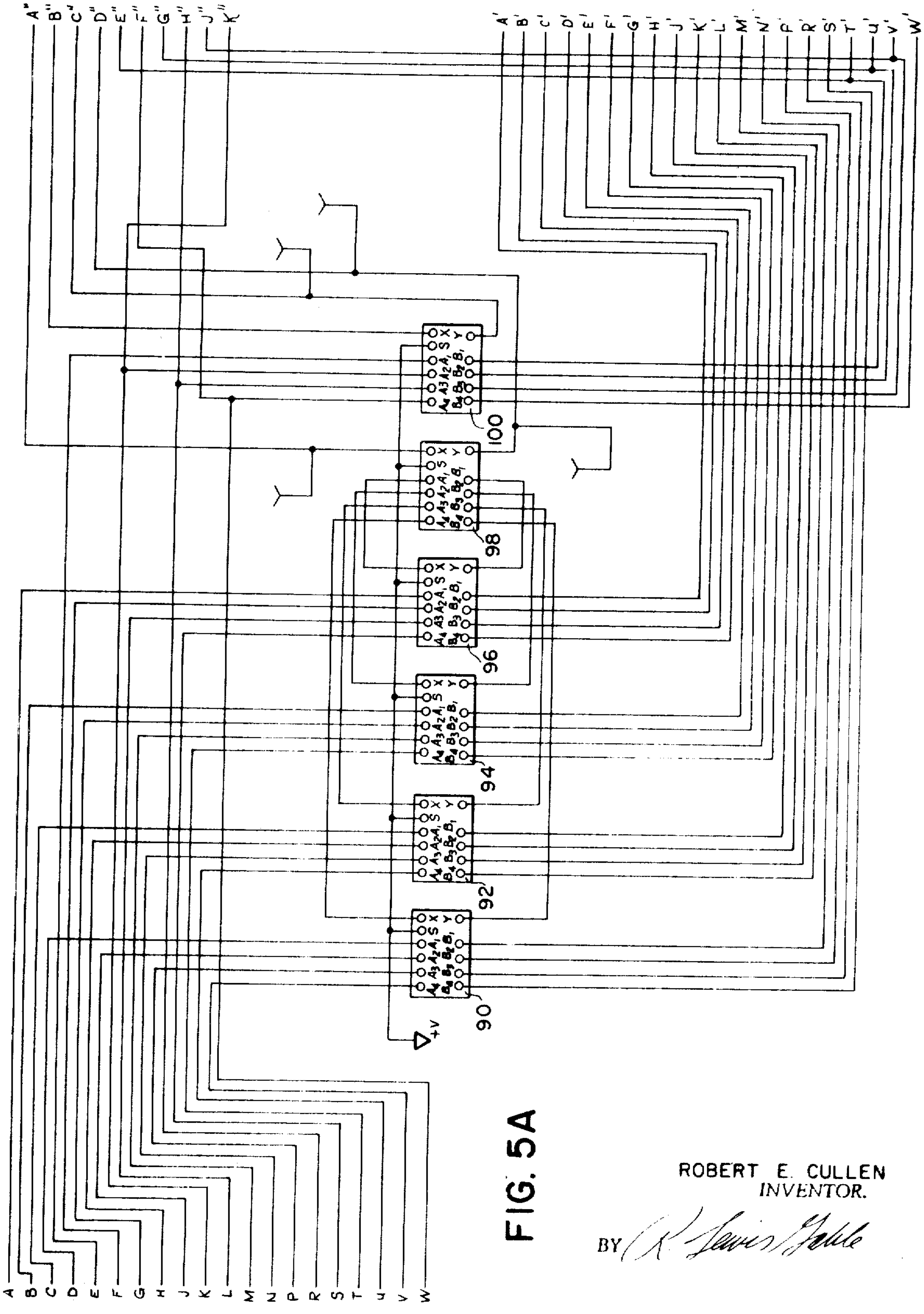
FIGS. 5A and 5B are schematic representations of the comparison logic circuit shown in FIG. 2.

With reference to FIG. 5A, the comparator 96 effects a comparison between the signals indicative of the 1's digit of the number of scanned images as derived from the outputs of the decade counter 80 of circuit 28 and the signals indicative of the units digit of the image to be accessed as derived from the A output terminals of the shift registers of the keyboard memory 24. More specifically, the 1's or A-output of the shift registers 70, 72, 74 and 76 are applied respectively to the $A_1$, $A_2$, $A_3$ and $A_4$ inputs of the comparator 96. The $A_o$, $B_o$, $C_o$ and $D_o$ outputs of the decade counter 80 are applied to the $B_1$, $B_2$, $B_3$ and $B_4$ inputs of the comparator 96, to effect a comparison of the units digit of the numbers stored on the circuits 24 and 28. It may be understood that the $A_1$, $A_2$, $A_3$ and $A_4$ (or $B_1$, $B_2$, $B_3$ and $B_4$) inputs of the comparator 96 are connected respectively to the 1's, 2's, 4's, and 8's bit of the memories from which the input signals are derived. In analogous fashion, the comparators 94, 92, 90 and 100 serve respectively to compare the 10's digit, the 100's digit, the 1,000's digit and the 10,000's digits of the numbers respectively stored on the counting circuit and memory 28 and the keyboard memory 24. Output signals will be derived from the X- and Y-terminals of the comparators 90, 92, 94, 96 and 100 indicative of whether a particular digit of the number derived from the circuit 28 is greater than the corresponding digit derived from the keyboard memory 24. As shown in FIG. 5A, the signals derived from the X- and Y-terminals of the 1's comparator 96, the 10's comparator 94, the 100's comparator 92, and the 1,000's comparator 90 are applied respectively to the $A_1$, $A_2$, $A_3$, and $A_4$, and to the $B_1$, $B_2$, $B_3$, and $B_4$ terminals of a comparator 98 to provide a 1 signal at either the X- or Y-terminal thereof, dependent upon whether the first four digits of the number stored upon the circuit 24 is greater than the number stored upon the circuit 28.

Figure 5B:
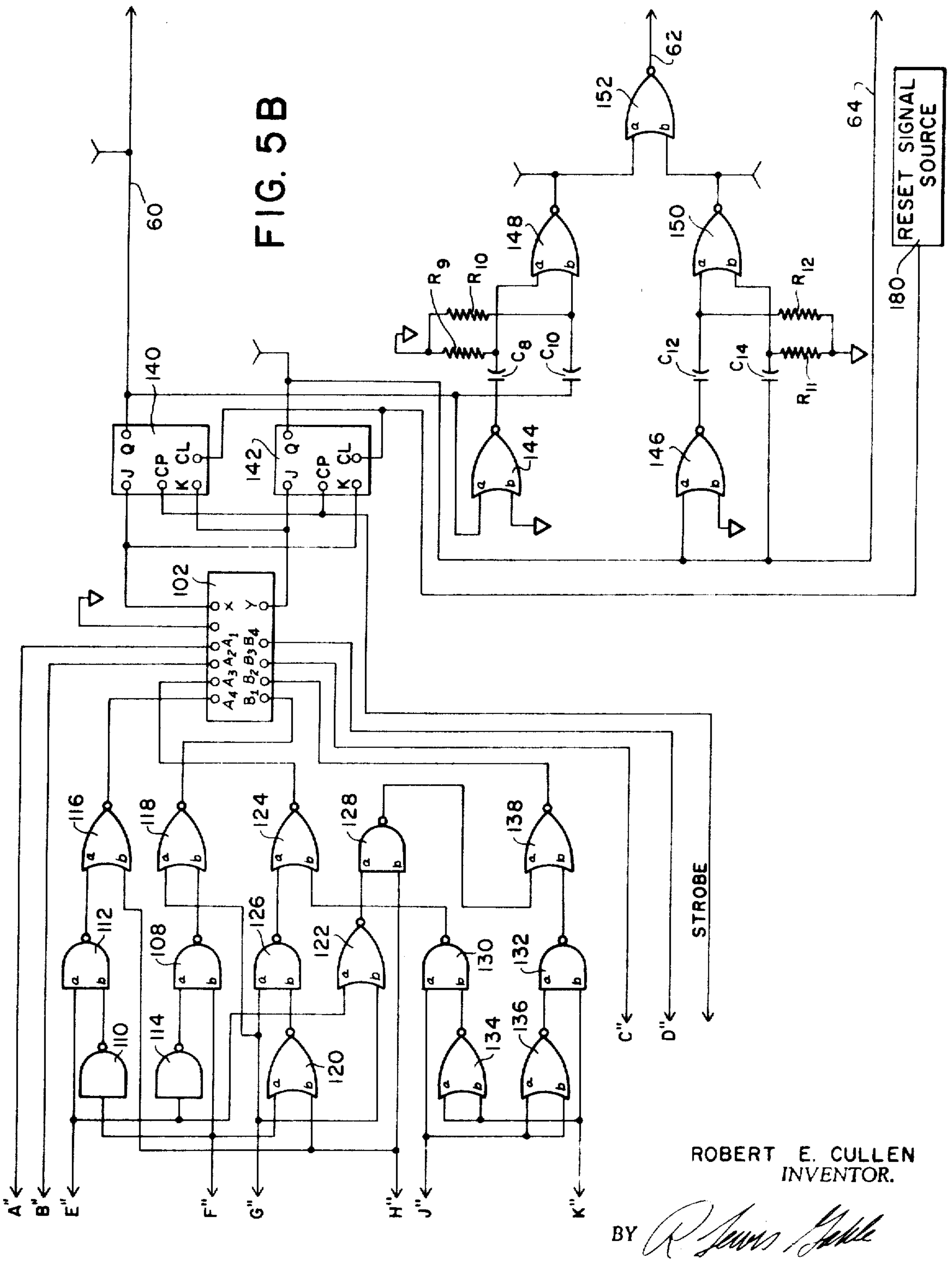

With reference to FIG. 5B, a further portion of the comparison logic circuit 26 is shown. The comparison logic circuit 26 includes a comparator 102 similar to that described above for making the final comparison between the numbers stored upon the counting circuit and memory 28 and that number stored upon the keyboard memory 24 to thereby provide signals as will be explained later from an X- and Y-terminal thereof to indicate in which direction the strip should be moved to access the desired image at the utilization station 17. More specifically, the signals derived from the X- and Y-terminals of the comparator 98 representing a comparison between the first four digits of the numbers to be compared, are applied respectively to the $A_1$ and $B_2$ terminals of the comparator 102. As shown in FIG. 5A, the signals representing in binary form the 10,000's digit of the number stored upon the counting circuit and memory 28 are applied respectively to the $A_1$, $A_2$, $A_3$ and $A_4$ input of the comparator 100. In a similar manner, the signals indicative of the 10,000's digit of the number stored upon the keyboard memory 24 are applied respectively to the $B_1$, $B_2$, $B_3$ and $B_4$ input terminals of the comparator 100. A "1" or high signal will be produced at either the X- or Y-terminal of the comparator 100 indicating whether the 10,000's digit of the number stored upon either the counting circuit and memory 28 or the keyboard member 24, is greater. The X- and Y-terminals of the comparator 100 are connected respectively to the $A_2$ and $B_2$ input terminals of the comparator 102. The description of the invention provided so far is typical of the prior art in that if the number stored upon the counting circuit and memory 28 is greater than that number stored upon the keyboard memory 24, a "1" signal will be developed at the Y-terminal of the comparator 102 and will cause the strip 10 of microfilm to be directed in a backward direction to access the desired image. Conversely, if a "1" is produced at the X-output of the comparator 102, this is an indication that the number of the image to be accessed is greater than the number of images scanned and it is desired to move the strip 10 of microfilm in a forward direction until the desired number of images have been scanned and counted, so that the preselected image may be accessed at the utilization station 17.

In the illustrative embodiment of the invention that has been described above, the shift registers and decade counters of the circuits 24 and 28 have had a five decade capacity for storing numbers up to 99,999. In many instances, it may be desired to count and to access images having numbers greater than 99,999 which would normally indicate that a sixth decade capability would be needed. However, in accordance with the teachings of this invention, image encoding numbers greater than 99,999 may be identified and the strip 10 of microfilm moved in the correct direction without employing a memory of additional capacity. In the example given above, a search was conducted upon a strip 10 of microfilm whose first or initial image was encoded with the number 80,000 and whose last image was encoded with the number 108,000. If it is now desired to access a number 108,000 upon the system as described above, the number 108,000 to be accessed is entered on the data input keyboard and encoding circuit 22. In particular, the number 108,000 will be entered by actuating in succession the switch 51 to enter a 1, the switch 50 to enter a 0, the switch 59 to enter an 8 and the switch 50 three times to enter three 0's. As a result, the shift registers 70, 72, and 74 and 76 have the digits 08,000 stored in the first five decades. The number 1 in the 100,000's digit has been lost since the shift registers 70, 72, 74 and 76 have no sixth decade capability. Thus, the system as described above would sense that the number to be accessed as 8,000, and a signal would be generated from the Y-terminal of the comparator 102 directing the strip 10 of microfilm to be directed in a backward direction. This would be an incorrect control on the part of the apparatus described above, since it would be desired to go 28,000 images in the forward or first direction of increasing numbers to access image 108,000.

In accordance with the teachings of this invention, the apparatus does not rely upon additional counting and memory capability but rather determines whether the difference between the two stored numbers is greater than a predetermined number. More specifically, the predetermined number should be the maximum number of images disposed a strip 10 of microfilm, and should not be greater than one half the memory and counting capacity of the control circuit 18. From this information, the portion of the comparison logic circuit 26 as shown in FIG. 5B infers that the capability of the counting circuit and memory 28, and the keyboard memory 24 has been exceeded and in particular that a 1 is present in the 100,000's digit of the encoding number of the image to be accessed and that the direction of search is in a forward direction. If the comparison logic circuit 26 determines as will be explained that the difference between the encoded number of the image to be accessed and the number stored upon the circuit 28 is less than the predetermined number, then the comparison logic circuit 26 will proceed to determine which number is greater to determine in which direction the strip 10 will be directed.

In the particular example described above, the shift registers and the decade counters of the memories 24 and 28 are capable of storing numbers up to 99,999. Therefore, the maximum number of documents that may be disposed from a single strip of microfilm should be less than 50,000 in order to access images having an encoding number in excess of 99,999 without adding a six decade capability to the circuits 24 and 28.

The circuitry for determining the difference between the two numbers stored on the five decade shift registers and counters of the circuits 24 and 28 could be quite complex and involve the comparison of 40 bits as presented on these five decade devices. However, if certain limitations are set for the number of images stored upon the strip 10 of microfilm, the circuitry of the comparison logic circuit 26 is greatly simplified. For example, if the maximum number of documents that could be stored on the strip 10 of microfilm is determined to be less than 40,000 and the shift registers and counters of the circuits 24 and 28 have a capacity of counting to 99,999, then only a limited number of digits, i.e., six, need to be compared and the circuitry of the comparison logic circuit 26 may be considerably simplified. Thus, it may be assumed that any request for an image 12 requiring a span of 60,000 or more images will be assumed to be a search for a document having an encoding number which differs in its 100,000's digits from that of the encoding number of the starting image. In accordance with the teachings of this invention, the comparison logic circuit 26 in response to the sensing of such a condition will instruct the search to be commenced in a direction opposite to that direction which would normally be indicated by a comparison between the five lowest digits of the encoding number of the starting image and the image to be accessed. Further, any request for an image that requires a span of less than 40,000 images will be assumed to be a search in which the 100,000's digit of the encoding number of the starting image is the same as the 100,000's digit of the encoding number for the image to be accessed; thus the search will be commenced in the direction indicated by the comparison of the five lowest digits of the respective numbers. Thus, any request for an image 12 that requires a search of between 40,000 and 59,999 images inclusive, is an illegal request, since there is no way to execute that request without spanning more than 40,000 documents. Thus, in an illustrative example wherein the capacity of the filmstrip is not greater than 40,000 images and the retrieval capacity of the apparatus is not greater than 99,999, it is only necessary to determine whether the requested search requires a span of more than 59,999 or less than 40,001 images; such a determination may be made with a limited amount of circuitry. For the illustrative embodiment described above, the determination may be made by comparing the 8, 4 and 2's bits of the fifth decades of the shift registers and counters of circuits 24 and 28. More specifically, this invention provides the method and apparatus for comparing a limited amount of information derived from the $B_0$, $C_0$ and $D_0$ terminals of the decade counter 88 with information derived from the E terminals of the shift registers 72, 74 and 76 to determine when there is a difference greater than the predetermined maximum and when to reverse the direction of the strip of microfilm.

In considering the various combinations of the binary signal of the fifth decade, it is apparent that the 8's bit or the 4's bit of one of the devices must be a "1" for there to be a possibility of difference of 40,000 between the numbers stored on the respective shift registers and counters of the circuits 24 and 28. If a "1" signal is stored on the 8's bit of both devices, the encoding numbers must be between 80,000 and 99,999, thus the difference must be less than 40,000. Since a "1" signal cannot be stored on both the 8's and 4's bit of the same devices, the only combinations that could possibly give the difference of more than 50,000 plus or minus 10,000 are the five cases given on the next page:

| Keyboard memory 24 | Counter and memory 28 | Memory 24 range | Memory 28 range | Reference range | Reverse direction of strip 10 |
|---|---|---|---|---|---|
| 8's 4's 2's (net) | 8's 4's 2's (net) | | | | |
| 1 0 0 | 0 1 0 or 1 | 80,000–99,999 | 40,000–79,000 | 00,001–59,999 | No. |
| 1 0 0 | 0 0 0 or 1 | 80,000–99,999 | 00,000–39,999 | 40,001–99,999 | Yes. |
| 0 1 1 | 0 0 0 | 60,000–79,999 | 00,000–19,999 | 40,001–79,000 | Yes. |
| 0 1 1 | 0 0 1 | 60,000–79,000 | 20,000–39,999 | 20,001–59,999 | No. |
| 0 1 0 | 0 0 0 | 40,000–59,999 | 00,000–19,999 | 20,001–59,999 | No. |

From the above chart, it can be seen that only cases 2 and 3 provide a difference in the stored numbers that is greater than 40,000. Thus, where the subscript M refers to the keyboard memory 24 and the subscript N refers to the counting circuit and memory 28, the conditions for strip reversal may be defined in Boolean terms, as follows:

$$\text{Reversal} = (8_M \cdot \overline{8_N} \cdot \overline{4_N}) + (4_M \cdot 2_M \cdot \overline{4_N} \cdot \overline{2_N} \cdot \overline{8_N})$$

With reference to FIG. 5A, it may be seen that the terms of the above equation may be derived from the $A_4$, $A_3$ and $A_2$, and the $B_4$, $B_3$, and $B_2$ terminals of the comparator 100.

In examining the first set of conditions that must be obtained to achieve reversal as stated in the above equation, it is noted that if the 8's bit of the fifth decade *"0" signals * of the keyboard memory 24 is a "1," must appear in the 4's and 2's bit of the fifth decade of the keyboard memory 24 and that any other state would be illegal. Further, the 2's bits of the fifth decade of the counting circuit and memory 28 may be either "1" or "0" signal. Therefore, the 4's and 2's bit of the keyboard memory 24 and the 2's bit of the counting circuit and memory 28 may be disregarded, in satisfying the first terms of the above equation.

With respect to FIG. 5B, there is shown a circuitry for determining the occurrence of the various conditions set out in the above equation. More specifically, a signal indicative of the 8's bit of the fifth decade of the counting circuit and memory 28 is applied through the terminal E'' to the a input of a NAND-gate 112 and to a NAND-gate 114, which is being used as an inverter. A signal indicative of the 8's bit of the fifth decade of the keyboard memory 24 is applied through terminal F'' to the *b* input of a NAND-gate 108 and to a NAND-gate 110, which is being used as an inverter. Further, a signal indicative of the 4's bit of the fifth decade of the counting circuit and memory 28 is applied through terminal G'' to the *a* input of a NOR-gate 118. **If the 8's bit of the fifth decade of the memories 24 and 28 are both "0," a "0" or a low signal will be applied to the *a* input of the NAND-gate 112 and the low signal will be applied to the NAND-gate 110** which will be inverted, therefore producing a "1" signal at the *b* input of the NAND-gate 112. In response thereto, the NAND-gate 112 will produce a "1" or high signal at the output thereof. In a similar fashion, a high or "1" signal and a low or "0" signal will be applied to the *b* and *a* inputs respectively of the NAND-gate 108, which in response thereto will produce a "1" signal. The "1" signal derived from the NAND-gate 112 is applied to the *a* input of the NOR-gate 116 which in response thereto generates a low or "0" signal to be applied to the $A_4$ input terminal of the comparator 102. In a similar fashion, the "1" or high signal developed by the NAND-gate 108 is applied to the *b* input of the NOR-gate 118 which in response thereto generates a "0" signal to be applied to the input terminal $B_4$ of the comparator 102. If a "1" or high signal appears on the 8's bit of the fifth decade of the memories 24 and 28, a "1" signal and a "0" signal will be applied respectively to *a* and *b* inputs of the NAND-gate 112 and a "0" signal and a "1" signal will be applied to the *a* and *b* inputs of the NAND-gate 108. In response thereto, the NAND-gates 108 and 112 will generate "1" signals which will be applied to the NOR-gates 116 and 118. In response to the "1" signals, the NOR-gates 116 and 118 generate "0" signals which are applied to the $A_4$ and $B_4$ input terminals of the comparator 102. Thus it can be seen if the 8's bit of the numbers stored upon the memories 24 and 28 are equal, that the input signals applied to $A_4$ and $B_4$ of the comparator 102 are equal; then, the inputs to the terminals $A_3$ and $A_2$ and $A_1$ and $B_3$ $B_2$, and $B_1$ representing the lower bits of the stored numbers will determine the comparator's 102 output.

In the situation where the 8's bit of the memory 28 is a "1" or high signal and the 8's bit of the memory 24 is a "0" or low signal, "1" signals will be applied to the *a* and *b* inputs of the NAND-gate 112, whereas "0" signals will be applied to the *a* and *b* inputs of the NAND-gate 108. In response to these inputs, NAND-gate 112 will generate a "0" signal, whereas the NAND-gate 108 will generate a "1" signal. Assuming that the 4's bit of the fifth decade of keyboard memory 24 is a "0," the NOR-gate 116 will apply a "1" signal to the input $A_4$, and the NOR-gate 118 will apply a "0" signal to the $B_4$ input terminal of the comparator 102. Thus, it will be seen that the conditions of the first term of the above equation are met, and that a "1" signal will be generated at the X-terminal and a "0" signal will be generated at the Y-signal of the comparator 102, thereby indicating that the numbers stored upon the keyboard memory 24 is greater than that stored upon the counter memory 28 because the span between respective numbers is greater than 40,000. As a result, a reversal of the strip motion will be accomplished to move the strip in a forward direction as opposed to a backward direction as would be indicated from the apparent numbers stored upon the memories 24 and 28. In the situation where the 8's bit of the fifth decade of the keyboard memory 24 is a "1" signal, and the 8's bit of the fifth decade of the counter circuit and memory 28 and the 4's bit of the fifth decade of the counting circuit and memory 28 are both "0's," "0" signals will be applied to the *a* and *b* inputs of the NAND-gate 112 and "1" signals will be applied to the *a* and *b* inputs of the NAND-gate 108. In response to these input signals, the NAND-gate 112 will apply a "1" signal to the *a* input of NOR-gate 116 whereas the NAND-gate 108 applies a "0" signal to the *b* input of the NOR-gate 118. Thus, the NOR-gate 116 will apply a "0" signal to the $A_4$ input terminal of comparator 102, whereas the NOR-gate 118, assuming a "0" input upon its *a* input terminal, will apply a "1" signal to the $B_4$ input terminal of comparator 102. In response to these input signals, the comparator 102 will produce a "1" signal at the Y-terminal and a "0" signal at the X-terminal indicating that the number stored upon the counter memory 28 is greater and that the strip 10 should be directed in a backward direction as opposed to a forward direction as would be normally indicated by the apparent numbers stored upon the memories 24 and 28.

The conditions of the second term of the equation given above are met in the following manner. If the 4's bit of the fifth decade of the memories 24 and 28 are both either "0" or "1" signals, NAND-gates 126 and 128 will generate "1" signals to be applied to NOR-gates 124 and 138. However, if the 4's bit of the fifth decade of the counter circuit and memory 28 is a "0" signal and the 4's bit of the fifth decade of the keyboard memory 24 is a "1" signal, the NAND-gate 128 will generate a "0" signal, whereas the NAND-gate 126 will generate a "1" signal. Conversely, if the 4's bit of the fifth decade of the counter circuit and memory 28 is a "1" signal and the 4's bit of the fifth decade of the keyboard memory 24 is a "0" signal, the NAND-gate 128 will generate a "1" signal whereas the NAND-gate 126 will generate a "0" signal. In analogous fashion to that described above, NAND-gates 130 and 132 compare the 2's bit of the fifth decades of the counter circuit memory 28 and the keyboard memory 24. Thus, if the 2's bits of the fifth decade of the memories 24 and 28 are either both 1's or both 0's, NAND-gates 130 and 132 will generate "1" signals to be applied to the *b* inputs of the NOR-gates 124 and 138 respectively. Thus, where the 4's bit of the fifth decade of the counter circuit and memory 28 is a "1" signal, the 4's bit of the fifth decade of the keyboard memory 24 is a "0" signal, the 2's bit of the fifth decade of the circuit and the counter circuit and memory 28 is a "1" signal, and the 2's bit of the fifth decade of the keyboard memory 24 is a "0" signal, then "0" signals will be applied to the inputs *a* and *b* of the NOR-gate 124, which in response thereto will generate a "1" signal to be applied to the $A_3$ terminal of the comparator 102. In addition, a "1" signal will be applied to the *a* input of the NOR-gate 138 which will apply a "0" signal to the $B_3$ input of comparator 102. In response to these input signals, the comparator 102 will generate a "1" signal at the X-terminal and a "0" signal at the Y-terminal, thus indicating a reversal, i.e., the strip 10 should be moved in a forward direction. Conversely, where the 4's bit of the fifth decade of the keyboard memory 24 is a "1" signal, and the 4's bit of the fifth decade of the counter memories 28 is a "0" signal, where the 2's bit of the fifth decade of the keyboard memory 24 is a "1" signal, the 2's bit of the fifth decade of the counter circuit and memory 28 is a "0" signal, a pair of "0" signals will be applied to the NOR-gate 138 which in response thereto will apply a "1" signal to the $B_3$ input of the comparator 102, whereas a pair of "1" signals to be applied to the *a* and *b* inputs of the NOR-gate 124 which in response thereto will apply a "0" signal to the $A_3$ input terminal of the comparator 102. Thus, the comparator will generate a "1" signal at the Y-terminal and a "0" signal at the X-terminal indicating a reversal of the strip direction and a movement of the strip 10 in a backward direction.

If neither of the terms of the equation given above apply, then the signals applied to the $A_4$ and the $B_4$, and the $A_3$ and $B_3$ terminals of the comparator 102 will be equal and the output from the comparator 102 will depend solely on the inputs applied to the $A_2$ and $B_2$, and the $A_1$ and $B_1$ terminals of the comparator 102. As explained above, the inputs signals applied to the $A_2$, $B_2$, $A_1$ and $B_1$ terminals are determined by comparing the respective bits of the encoded numbers stored upon the keyboard memory 24 and the counting circuit and memory 28. Thus, only for those conditions which meet the terms of the equations defined above, will be difference between the numbers stored upon the keyboard memory 24 and the counting circuit and memory 28 be greater than the predetermined maximum, i.e., 50,000 plus or minus 10,000, to thereby effect reversal of the strip 10. In the other situations, the strip will be directed according to which of the numbers stored upon the keyboard memory 24 and the counting circuit and memory 28 is greater.

The previous comparison made between the number stored upon the memories 24 and 28 have resulted in output signals derived from the X- and Y-terminals of the comparator 102. However, these signals cannot be used directly to control the movement of the strip 10 of microfilm, because the comparators as shown in FIGS. 5A and 5B may generate false states during their switching operations. Consequently, the output signals derived from the X- and Y-terminals of comparator 102 are applied to JK flip-flops 140 and 142. In particular, the signal generated at the X terminal is applied to the J-terminal of JK flip-flop 140 and the K input terminal of the JK flip-flop 142, and the signal generated at the Y terminal is applied to the K-input terminal of JK flip-flop terminal 140 and to the J-input terminal of the JK flip-flop 142. As a result, the signals used to control the movement of the strip 10 of microfilm are derived from the Q output terminals of the JK flip-flop 140 and 142 only after a new comparison has been made and the output signals derived from the comparators have been allowed to stabilize. As seen in FIGS. 2 and 5B, the signals developed at the Q output terminals of the JK flip-flops 140 and 142 are applied through conductors 60 and 64 to the strip control circuit 32 to thereby control the movement of the strip 10 of the microfilm.

The operation of a typical search will now be explained. For example, the counter circuit and memory 28 could be reset to 00,000 and the number, e.g., 01,000, could be entered through the date input keyboard circuit 22 onto the keyboard memory 24. Since the number stored upon the keyboard memory 24 is greater than that number stored on the counting circuit and memory 28, a "1" signal will be generated at the X-terminal and a "0" signal will be generated at the Y-terminal of the comparator 102. Initially, "0" signals will appear at the Q output terminals of the JK flip-flop's 140 and 142 since both of the JK flip-flop's 140 and 142 were reset at the end of the previous operation by a signal derived from reset signal source 180.

When a search switch (not shown) is thrown to initiate the search, a strobe signal is generated and applied to the CP input of the JK flip-flop's 140 and 142. The JK flip-flop's 140 and 142 operate in the following manner:

1. When the pulse applied to the CP input is low or "0" signal, the Q-output remain the same, independent of the signals applied to the J- and K-inputs.

2. When the pulse applied to the CP input rises to a high or "1" signal, the signals applied to the inputs J and K are transferred into an internal latch or storage portion of the flip-flop's 140 and 142, and 3. When the applied pulse to the CP input falls to a "0" signal, the internally stored input data transfers to the output Q according to the following rules:

| If, at the movement the pulse rises, the inputs are: | Then, when the pulse falls, the outputs will be: |
|---|---|
| J=1, K=0 | Q=1 |
| J=0, K=1 | Q=0 |
| J=0, K=0 | Q will remain the same |
| J=1, K=1 | Q will become the opposite of its former state |

According to these rules, "1" and "0" signals will appear respectively at the Q-terminals of the JK flip-flop's 140 and 142 when the strobe pulse falls to a "0" signal.

As explained in detail in the above-identified applications, a clock signal is generated within the sequence detection circuit 20 and is used to provide a strobe signal which is applied to the CP inputs of the flip-flops 140 and 142. Until a first coincidence of the number stored on the memories 24 and 28 occurs, each count or comparison of the comparator 102 results in a "1" signal and a "0" signal appearing at the X- and Y-outputs terminals of the comparator 102. Further, a "1" signal and a "0" signal appear respectively at the Q-outputs of the JK flip-flops 140 and 142 at the falling of each strobe or clock pulse. Until the first coincidence of the stored number is reached, the output terminals X and Y will generate "1" and "0" signals respectively which are in turn applied to the JK flip-flops 140 and 142. After each strobe or clock pulse has occurred, a "1" signal and a "0" signal will appear respectively at the Q-output terminals of the JK flip-flops 140 and 142. Thus, a "1" signal will be applied through the conductor 60 to the strip circuit 32 to continue to drive the strip 10 of microfilm in the same forward or first direction.

When the first coincidence of the numbers stored upon the memories 24 and 28 occurs, "1" signals will be generated at the X and Y output terminals of the comparator 102 and applied to the flip-flops 140 and 142. After stabilization of the input signals, a "0" signal and a "1" signal will appear at the Q output terminals of the JK flip-flops 140 and 142 at the falling of the next strobe pulse. The output signal derived from the Q output terminal of JK flip-flop 142 is a "1" signal which causes the strip control circuit 32 to effect a reversal of the strip movement.

A coincidence signal is generated in response to the change of states of the signals produced at the Q output terminals of the JK flip-flop's 140 and 142, and is applied along a conductor 62 to the strip control circuit 32 to be entered upon a memory portion thereof. More specifically, if the signal appearing at the output Q of the JK flip-flop 140 goes from a "0" to a "1" signal, the "1" signal will be applied to a differentiating circuit comprising a capacitor $C_{10}$ and a resistor $R_{10}$ to thereby apply a positive pulse to the *b* input of a NOR-gate 148. In analogous manner, if the signal appearing at the Q-output of the JK flip-flop 140 goes from a "1" to a "0" signal, a "1" signal will be produced at the output of a NOR-gate 144. The "1" signal appearing upon the output of the NOR-gate 144 will be differentiated by the circuit comprising a capacitor $C_8$ and a resistor $R_9$ to apply a positive pulse at the *a* input of the NOR-gate 148. In either event, the output of the NOR-gate 148 will be a "0" pulse whenever the signal appearing at the Q output terminal of the JK flip-flop 140 changes state. In a similar manner, a NOR-gate 150 will produce a "0" pulse whenever the signal appearing at the Q output terminal of the JK flip-flop 142 changes state. Thus, at a coincidence where the signals of the Q output terminals of the JK flip-flops 140 and 142 change state, the signals applied to the *a* and *b* inputs of a NOR-gate 152 are "0" pulses and as a result, the NOR-gate 152 produces a high or "1" output pulse indicative of a coincidence between the numbers stored upon the memories 24 and 28. It is noted that at the initiation of a search that only the output signal appearing at one of the Q output terminals of the flip-flop's 140 and 142 will change state. Therefore, no coincident pulse will be generated by the NOR-gate 152 when the search is initiated.

In illustrative embodiment of this invention, the image 12 to be accessed is moved at a high speed to the utilization station 17 at which the first coincidence signal is generated as described above. As the strip 10 overshoots the strip 10 of microfilm will be moved at a medium speed in an opposite direction under the influence of the "1" signal generated at the Q-output of the JK flip-flop 142, until a second coincidence occurs. At the second coincidence, a second coincidence signal will be applied to the strip control circuit 32 and stored upon its memory counter. As the strip 10 overshoots, the strip direction will be reversed and the image 12 to be accessed will be moved at a slow speed to the utilization station 17. At the third occurrence, the coincidence counter causes the strip control circuit 32 to stop the strip deive mechanism and to place the image 12 to be accessed at the utilization station 17. Further, the strip control circuit 32 will cause the source 180 to generate a reset signal to be applied to the CL inputs of the JK flip-flop's 140 and 142 to thereby place "0" signals at the Q output terminals thereof.

Thus, there has been shown apparatus and method for accessing a selected image recorded on a strip of information storage medium such as microfilm. In particular, the strip of film must move past an assembly of photocells for sensing marks associated with the images. The signals so generated are counted and compared with the encoding number of the image to be accessed. In accordance with the teachings of this invention, the capability of the apparatus for counting the scanned image and for storing the number of images to be accessed is extended with the addition of minimal circuitry to enable images encoded with numbers above the inherent capability of the system to be accessed.

The invention has been described in detail with particular reference to a preferred embodiment thereof, but it will be understood that variations and modifications can be affected within the spirit and scope of the invention.

I claim:

1. Apparatus for accessing a selected image from a plurality of images recorded on a strip of information-bearing medium, the images being identified by sequentially assigned numbers, said apparatus comprising:
   - memory means for receiving and providing a first manifestation of the apparent assigned number of the image to be accessed;
   - means for sensing the images as the strip is moved with respect to said sensing means and for counting the sensed images to provide a second manifestation indicative of the apparent number of the sensed images; and
   - comparison means operative in a first mode for comparing the first and second manifestations to determine which of the first or second manifestation is greater to thereby effect the movement of the strip in a first direction, and operative in a second mode when the difference between the first and second manifestations is greater than a predetermined value to effect the movement of the strip in a second direction opposite to the first direction.

2. Apparatus for accessing a selected image from a plurality of images recorded on a strip of information-bearing medium, the images being identified by sequentially assigned numbers, said apparatus comprising:
   - memory means for receiving and for providing a first manifestation of the apparent assigned number of the image to be accessed, said memory means having a given capability for receiving the assigned number of the image to be accessed,
   - means for sensing the images as the strip is moved with respect to said sensing means and for counting the sensed images to provide a second manifestation indicative of the apparatus number of sensed images; and said means for sensing and counting having a given capability of counting the number of sensed images; and
   - comparison means having a given capability of comparing the first and second manifestations not in excess of the given capability of said memory means and said means for sensing and counting, said comparison means operative in a first mode to indicate whether the first or second manifestation is greater to thereby effect movement of the strip in a first direction and operative in a second mode when the difference between the first and second manifestations is not less than half the capability of said comparison means, to effect the movement of the strip in a second direction opposite to the first direction.

3. Apparatus for accessing a selected image from a plurality of images disposed on a strip of information-bearing medium, the images being identified by sequentially assigned numbers, said apparatus comprising:
   - memory means for receiving and providing a first manifestation of the apparent number assigned to the image to be accessed;
   - means for scanning and counting the images beginning with a first image, as the strip is moved with respect to said sensing means and for providing a second manifestation indicative of apparent number of the images sensed by said sensing means; and
   - comparison means operative in a first mode for comparing the first and second manifestations to determine whether the first or second manifestation is greater to thereby effect movement of the strip in a first direction, and operative in a second mode when the difference between the first manifestation and the second manifestation for the first image is greater than a predetermined value to effect the movement of the strip in a second direction opposite to the first direction.

4. Apparatus for accessing a selected image from an N-number of images recorded on a strip of an information-bearing medium, the images being identified by a sequentially assigned number, said apparatus comprising:

memory means having a limited capability for receiving the assigned number of the image to be accessed and for storing a first manifestation of a portion of the assigned number, the portion of the assigned number being dependent upon said capability of said memory means;

means having a limited capability for sensing the passage of the images and for providing a second manifestation of a portion of the number of the images sensed as the strip is moved with respect to said sensing means; the portion of the number of sensed images being dependent upon said capability of said sensing means and comparison means operative in a first mode to compare the first and second manifestations to determine whether the first or second manifestation is greater to thereby effect the movement of the strip in a first direction, and in a second mode, when the difference between the first and second manifestations exceeds a predetermined value to thereby effect the movement of the strip in a second direction opposite to the first direction.

5. Apparatus for accessing a selected image from an N-number of images recorded on a strip of information bearing medium, the images being identified by sequentially assigned numbers, the first recorded image being assigned to the lowest number and the last recorded image being assigned the number equal to N plus the lower number, said apparatus comprising:

memory means for receiving the assigned number of the image to be accessed and storing a first manifestation of a portion of the assign number, said memory means having a limited capability for receiving the assigned number greater than twice N, the portion of the assigned number being dependent upon said capability of said memory means;

means for sensing the passage of the images and for counting the number of sensed images as the strip is moved with respect to said sensing means to provide a second manifestation of a portion of the number of sensed images, said sensing and counting means having a limited capability of counting greater than twice N, the portion of the number of sensed images being dependent upon said capability of said sensing means; and comparison means operative in a first mode to determine whether the first or second manifestation is greater to thereby effect the movement of the strip in a first direction, and operative in a second mode, when the difference between the first and second manifestations is not less than half of said capability of either said memory means or said sensing means, to thereby effect the movement of the strip in a second direction opposite to the first direction.

6. Apparatus for accessing a selected image from a number of images recorded on a strip of information-bearing media, the images being identified by sequentially assigned numbers, said apparatus comprising:

memory means for receiving the assigned number of the image to be accessed and storing a first manifestation of the apparent number assigned to the image to be accessed;

means for scanning and counting the passage of images beginning with the first scanned image as the strip is moved with respect to said scanning and counting means and providing a second manifestation of the apparent number of counted images, and comparison means operative in a first mode to determine whether the first or second manifestation is greater to thereby effect the movement of the strip in a first direction, and operative in a second mode, when the difference between the first manifestation and the second manifestations for the first scanned image exceeds a predetermined value, to effect the movement of the strip in a second direction to a first direction.

7. Apparatus for accessing a selected image from an N-number of images recorded on a strip of information-bearing medium, the images being identified by sequentially assigned numbers, the first image on the strip being assigned the lowest number and the last image on the strip being assigned a number equal to the lowest number plus N, said apparatus comprising:

first memory means having a first number of decade storage devices for storing a first manifestation of a corresponding number of digits of the assigned number of the image to be accessed;

means for sensing the passage of the images of the strip as the strip is moved with respect to said sensing means and for providing a second manifestation of the number of sensed images;

second memory means having a second number of decade storage devices and responsive to the second manifestation of said sensing means for storing a third manifestation a corresponding number of digits of the number of sensed images; and means operative in a first mode for comparing the first and third manifestations sensed to determine which manifestation is greater to effect the movement of the strip in a first direction, and operative in a second mode when the difference between the first and third manifestations is not less than half the maximum number capable of being stored on either the first or second number of decade storage devices, to effect the movement of the strip in a second direction opposite to the first direction.

8. Apparatus as claimed in claim 7, wherein said comparison means includes logic means responsive to one of the decades of said first memory means and to one of the decade storage devices of the second memory means to determine when the difference is greater.

9. Apparatus for accessing a selected image from an N-number of images recorded on a strip of an information-bearing medium, the images being identified by sequentially assigned numbers, the first image on the strip being assigned the lowest number and the last image on the strip being assigned a number equal to the lowest number plus N, said apparatus comprising:

first memory means having an M-number of decade storage devices for storing a first manifestation of a corresponding number of digits of the assigned number of images to be accessed;

means for sensing the passage of the images as the strip is moved with respect to said sensing means and for providing a second manifestation of the number of sensed images;

second memory means having an M-number of decade storage devices and responsive to the second manifestation for storing a third manifestation of a corresponding number of digits of the number of sensed images; and comparison means operative in a first mode to compare the first and third manifestations to determine which manifestation is greater to thereby effect the movement of the s trip in a first direction, and operative in a second mode in response to said Mth decade storage devices of said first and second memory means to determine when the difference between the first and third manifestations sensed is greater than a selected percentage of the maximum number capable of being stored on the M-number of decade storage devices, to thereby effect the movement of the strip in a second direction opposite to the first direction.

10. Apparatus as claimed in claim 9, wherein the percentage is 50 percent.

11. Apparatus as claimed in claim 9, wherein the percentage is 40 percent.

12. Apparatus for accessing a selected image from an N-number of images recorded on a strip of an information-bearing medium, the images being identified by sequentially assigned numbers, the first image on a strip being assigned the lowest number and the last image on the strip being assigned a number equal to the lowest number plus N, said apparatus comprising:

first memory means having an M-number of decade storage devices, said aforementioned decade storage devices having first, second and third terminals for providing a first manifestation in binary form of M-digits of the assigned number of the image to be accessed;

means for sensing the passage of the images as the strip is moved with respect to said sensing means and for providing a second manifestation of the number of the sensed images;

second memory means having an M-number of decade storage devices, said aforementioned decade storage devices having first, second and third terminals and responsive to the second manifestation to provide a third manifestation in binary form of M-digits of the number of sensed images; and comparison means operative in a first mode to compare the first and third manifestations to determine which manifestation is greater to thereby effect the movement of the strip in a first direction, and operative in a second mode, when the difference between the first manifestation and third manifestation is greater than a predetermined value, to effect the movement of the strip in a second direction opposite to the first direction.

13. Apparatus as claimed in claim 12, wherein said comparison means includes a logic means coupled to the first, second and third terminals of both of said Mth decade storage devices of said first and second memory means to determine when the difference between the first manifestation and the second manifestation is greater than the predetermined value.

14. Apparatus as claimed in claim 13 wherein said logic means is responsive to a "1" logic signal derived from the third terminal of said Mth decade storage device of said first memory means and to "" logic signals derived from the first and second terminals of the Mth decade storage device of said second memory means to effect the movement of the strip in the second direction.

15. Apparatus as claimed in claim 14, wherein said logic means is responsive to "1" logic signals derived from the second and third terminal of the Mth decade storage device of said first memory means and to "0" logic signals derived from the first, second and third terminals of the Mth decade storage device of said second memory means to effect the movement of the strip in the second direction.

16. Apparatus for accessing a selected image from a number of images recorded on a strip of an information-bearing media, the images being identified by sequentially assigned numbers, said apparatus comprising:

first memory means having an M-number of decade storage devices, said aforementioned decade storage devices having 8's, 4's and 2's bit terminals for providing a first manifestation in binary form of M-digits of the assigned number of images to be accessed;

means for sensing the passage of the images as the strip is moved with respect to said sensing means and for providing a second manifestation of the number of sensed images;

second memory means having an M-number of storage decade devices, said aforementioned decade storage devices having 8's, 4's, and 2's bit terminals and responsive to the second manifestation for providing a third manifestation of M-digits of the number of sensed images; and comparison means operative in a first mode to compare the first and third manifestations sensed to thereby effect the movement of the strip in a first direction, and operative in a second mode in response to a "0" signal derived from the 8's bit of the Mth decade storage device of said first memory means and to "0" signals derived for the 8's and 4's bit of the Mth decade storage device of said second memory means to effect the movement of the strip in a second direction opposite to the first direction.

17. Apparatus as claimed in claim 14, wherein said comparison means is responsive to "1" signals derived from the 4's and 2's bit terminals to said Mth decade storage device of said first memory means and to "0" signals derived from the 8's, 4's and 2's bit terminals of said Mth decade storage device of said second memory means to effect the movement of the strip in the second direction.

* * * * *